E. F. HOFFMANN.
MACHINE FOR CUTTING METAL BARS.
APPLICATION FILED APR. 14, 1917.
1,245,460.
Patented Nov. 6, 1917.
2 SHEETS—SHEET 1.
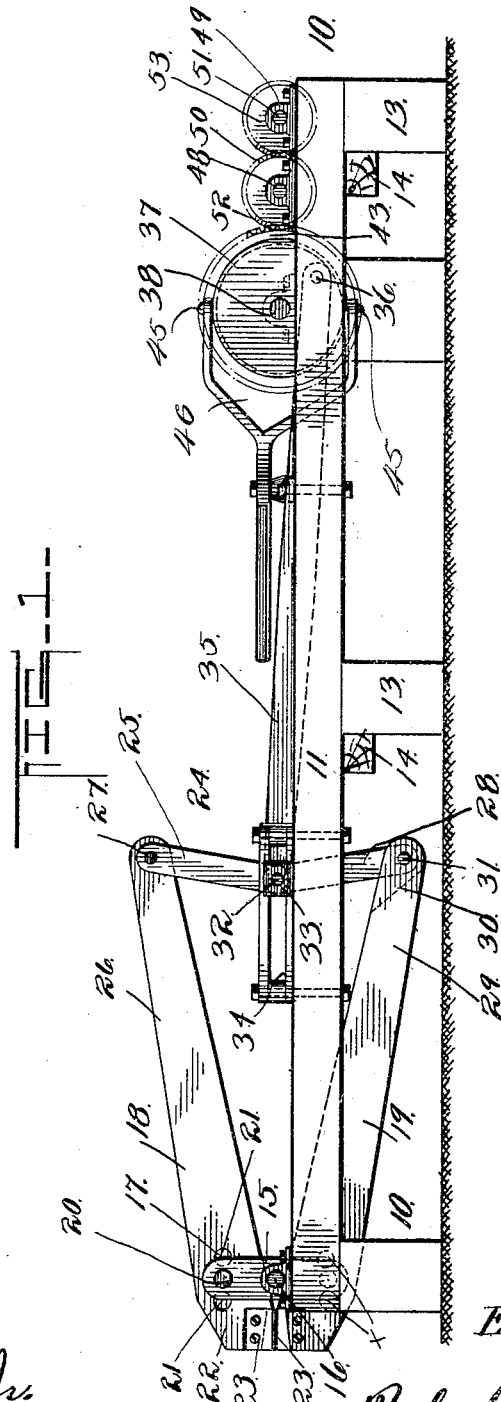
INVENTOR
Ernst F. Hoffmann,
WITNESSES
BY
ATTORNEY

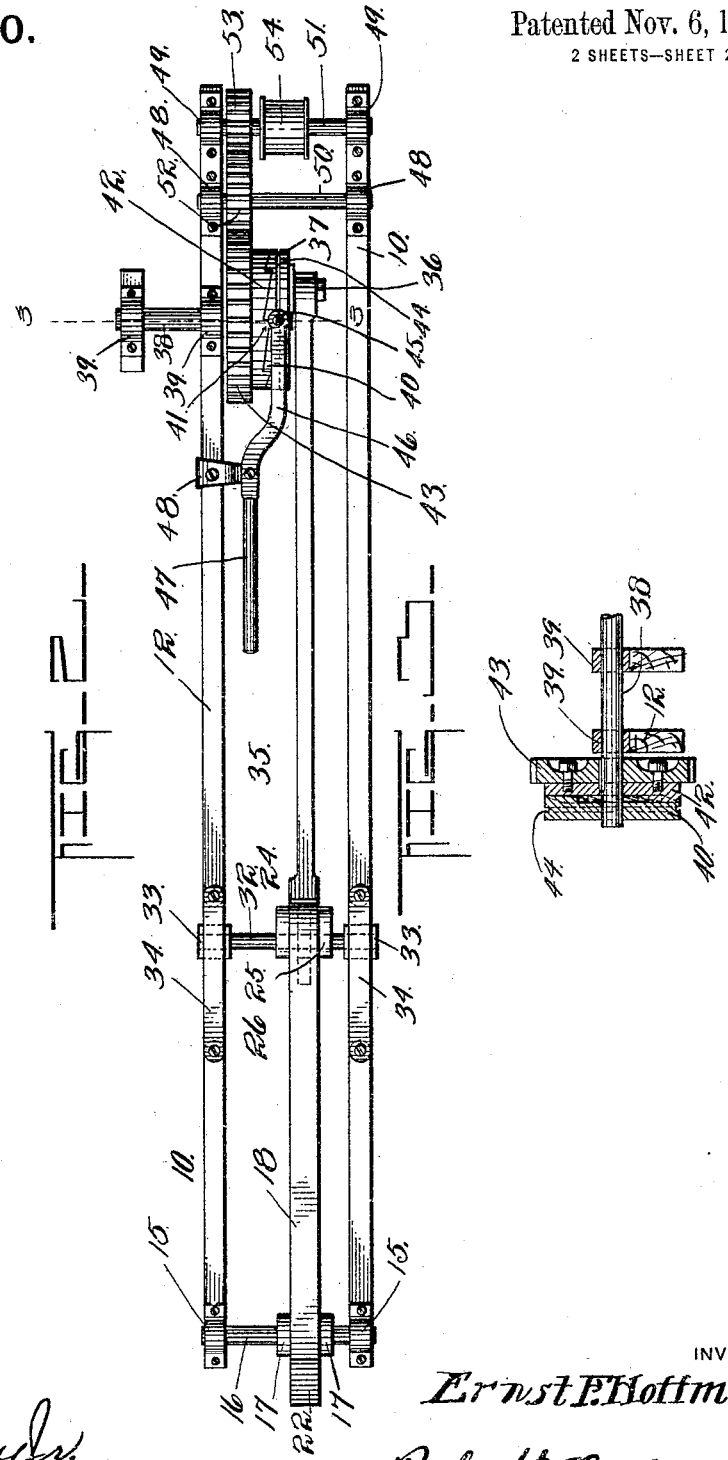

UNITED STATES PATENT OFFICE.

ERNST F. HOFFMANN, OF NORFOLK, VIRGINIA.

MACHINE FOR CUTTING METAL BARS.

1,245,460.   Specification of Letters Patent.   Patented Nov. 6, 1917.

Application filed April 14, 1917. Serial No. 162,089.

*To all whom it may concern:*

Be it known that I, ERNST F. HOFFMANN, a citizen of the United States, residing at Norfolk, in the county of Norfolk and State of Virginia, have invented certain new and useful Improvements in Machines for Cutting Metal Bars, of which the following is a specification.

This invention relates to a machine for cutting metal bars and has for its object to provide a simple, cheap and portable machine of this class which may be set up and used wherever power is obtainable, and is particularly useful as a machine which may be employed with great economy by contractors for buildings and other large structures where a great number and variety of steel bars are used.

Another object of the invention is to provide a machine of this class with certain parts made of metal that may be readily mounted and dismounted from a frame which can, if so disposed, be made of wood, and when disassembled these parts may be readily shipped wherever desired and can be handled readily during shipment as the separated parts are relatively light and occupy comparatively little space.

With the above as the principal objects in view, the invention consists in the novel construction, combination and arrangement of parts hereinafter described, pointed out in the appended claims and illustrated in the accompanying drawings, in which:—

Figure 1 is a side elevation of the complete machine.

Fig. 2 is a top plan view of the machine, and

Fig. 3 is a detailed cross sectional view on the line 3—3 of Fig. 2.

In the drawing, 10 indicates the main frame of the machine which may be made of any material but in the present instance is shown as comprising two parallel longitudinal wooden beams 11 and 12 mounted upon supports 13 that reach upwardly a short distance from the ground. These beams may be tied together by cross bars 14 or by any other convenient means that render them thoroughly rigid.

At one end of each beam 11 and 12 is bolted a bearing block 15 in which is journaled a horizontal transverse shaft 16 on which are mounted two plates 17 fixed on the shaft and spaced apart to receive therebetween two shear bars 18 and 19. The shaft 16 passes centrally through the plates 17 which latter have perforations in their extreme ends equally spaced from the shaft 16 to receive pivot pins 20 that also pass through one of a series of perforations 21 in the shear bars. Preferably these pins are headed on one end and have a nut screwed upon the other end, or if preferred the pins may be threaded on both ends to receive nuts. By this means the plates 17 are prevented from spreading under pressure.

The perforations 21 are situated near one end of each shear bar and by removing the pins 20 and reinserting them in one or the other of said perforations, the leverage of said shear bars may be increased or diminished to suit the work to be done. The shear bars are in fact levers, the shorter arms 22 of which are each provided with a knife blade 23, which blades coöperate to sever bars of metal placed therebetween, the shear bars rocking on their pivot pins 20 in the plates 17 while the latter are supported by the main frame 10.

The shear bars 18 and 19 are vertically disposed one above the other, their longer arms being separated to a greater or lesser extent and between them is a toggle 24 by means of which the cutting blades 23 are moved to and from each other. The toggle 24 here shown is formed of two links 25 pivoted at the extremity of the long arm 26 of the shear bar 18, the two links 25 being pivoted on opposite sides of the arms 26 by a pin 27. A single link 28 is pivoted in a notch 30 in the long arm 29 of the shear bar 19 by means of a pivot pin 31. The links 25 and 28 extend from their pivotal connection toward each other, their ends being connected by a cross bar 32 pivoted to said links, the ends of which cross bars are mounted in sliding boxes 33 movable longitudinally between the guide plates 34 bolted to the beams 11 and 12. Upon moving the beam 32 toward the cutter blades 23, the long arms of the shear bars 18 and 19 are drawn together and the cutter blades separated for the insertion of a bar of metal while a reverse movement of the sliding bar 32 straightens the links of the toggle 24 and forces the blades 23 together to cut the bar therebetween.

The toggle 24 is operated to rock the shear bars 18 and 19 by a pitman 35 pivoted to the sliding cross bar 32 at one of its ends and to a crank pin 36 passing through its other end, said crank pin projecting from one face of a clutch member 37 rotatable freely upon a horizontal shaft 38 supported in bearings 39 on the main frame. The opposite face of the clutch member 37 is provided with a plurality of ratchet-shaped teeth 40 for engaging like teeth 41 on a second clutch member 42 keyed on the shaft 38 and bolted against one side of a spur gear 43. The periphery of the clutch member 37 is shown with a circumferential groove 44 to receive pins 45 projecting thereinto from the forked end 46 of a shifting lever 47 pivotally mounted on a bracket 48 bolted to the main frame.

When light shearing is to be done by the cutter blades 23 the prime mover may be connected directly to the shaft 38 on which is mounted the clutch member 42. Then by engaging the two clutch members 37 and 42, the pitman 35 will actuate the shear bars and cutter blades with some rapidity. When heavier cutting is to be done, slower speed and greater power is necessary. To accomplish this without changing the direction of rotation of the shaft 38 there is mounted upon the frame 10 in bearings 48 and 49 two horizontal cross shafts 50 and 51 the former carrying a pinion 52 which may be loose on the shaft 50 while a like pinion 53 is fixed on the shaft 51. The latter shaft may be extended and connected direct to the motor engine or driven therefrom by a belt passing over a pulley 54 on said shaft. The pinion 53 meshing with the pinion 52 and the latter in turn meshing with a gear wheel 43 will cause the latter to rotate slowly and in the same direction as before so as to maintain connection between the clutch members. When it is desired to stop the operation of the cutters without stopping the engine, the clutch members are separated by moving the lever 47 in the proper direction.

In a machine such as described, which is particularly useful for contractors who erect large buildings and other structures containing a great deal of metal, the machine by its portability, economy of first cost and also in time and space occupied for its erection, is of particular value. The framework, which as described may be made of wooden beams, may be of any length to suit the floor or ground space for the machine. The pitman 35 is also made of wood and its length will depend upon the length of the beams 11 and 12 and the distance between the shaft 38 and the guide plates 34. By making the frame of wood a great saving in cost is effected and the necessity of shifting a heavy weight whenever the machine is to be moved from one place to another is thus eliminated.

What is claimed is:

1. A metal bar cutting machine comprising a main frame, cutting members movably mounted on said frame, a toggle connected to said cutting members for operating the same, a shaft, means for rotating said shaft, a crank connection for operating said toggle and mounted to rotate loosely upon said shaft, and a clutch between said crank mechanism and the shaft.

2. A machine for cutting metal bars comprising a pair of rocking levers having cutting members on their shorter ends, and connected at their longer ends by a toggle, a pitman connected to said toggle for operating the same, a shaft, a disk loosely mounted on said shaft and provided on one face with clutch teeth and on its opposite face with a crank pin pivoted to said pitman, a coöperating clutch member fixed on said shaft, and means for rotating the shaft.

3. A machine for cutting metal bars comprising a pair of rocking levers pivotally mounted between parallel plates, a shaft supporting said plates, cutting elements on the shorter ends of said levers, a toggle connecting the longer ends of the levers, a pitman connected at one end to the toggle, a shaft, a crank disk rotatable freely on said shaft and also movable longitudinally thereon, a crank pin connecting the opposite end of the pitman with the crank disk, clutch teeth on the opposite face of the crank disk, a coöperating clutch member fixed on the shaft, and means for rotating the shaft.

4. In a machine for cutting metal bars, the combination with a frame, a pair of shearing levers at one end of said frame, a cross shaft journaled on the frame and having plates fixed thereto, said shearing levers being pivotally connected between said plates, cutting blades mounted on the shorter ends of said levers, a toggle connected to the longer arms of the lever, and to a sliding bar, guides for said bar mounted on the frame, a pitman connected to said slide bar, crank means operating said pitman, a shaft on which said crank mechanism is mounted to rotate freely, means for positively driving said shaft, and a clutch connection between said shaft and said crank mechanism.

5. In a machine for cutting metal bars, the combination of a main frame, shearing levers pivotally mounted at one end of said frame, and adjustable on their pivots to increase or decrease the leverage, cutting blades secured on the shorter arms of the levers, a toggle connected to the longer arms of the levers and to a guide bar, a pitman pivoted to said guide bar for operating the toggle, a shaft, a gear wheel fixed to said shaft, a train of pinions in mesh with said gear wheels, a clutch member fixed to said shaft and to said gear wheel, a second clutch member loosely mounted on said shaft and movable longitudinally thereon to engage the first clutch member, and a crank pin connecting said pitman to the second clutch member.

In testimony whereof I affix my signature in presence of two witnesses.

ERNST F. HOFFMANN.

Witnesses:
  RUDOLPH MUELLER,
  JNO. S. HARVEY.

Copies of this patent may be obtained for five cents each, by addressing the "Commissioner of Patents, Washington, D. C."